(12) United States Patent  
Cooper (10) Patent No.: US 6,484,964 B1
(45) Date of Patent: Nov. 26, 2002

(54) WELDING WIRE DEREELER

(75) Inventor: Edward L. Cooper, Clarklake, MI (US)

(73) Assignee: Elco Enterprises, Inc., Jackson, MI (US)

(*) Notice: Subject to any disclaimer, the term of this patent is extended or adjusted under 35 U.S.C. 154(b) by 54 days.

(21) Appl. No.: 09/640,055

(22) Filed: Aug. 17, 2000

(51) Int. Cl.[7] .............................................. B65H 67/00
(52) U.S. Cl. ................................................. 242/559.1
(58) Field of Search ............................ 242/564, 559.1, 242/559, 558

(56) References Cited

U.S. PATENT DOCUMENTS

| 2,663,515 A | * | 12/1953 | Kinsinger | 242/559.1 |
| 2,879,011 A | * | 3/1959 | Nelson | 242/559.1 |
| 3,464,645 A | * | 9/1969 | Pearson | 242/559.1 |
| 4,162,025 A | * | 7/1979 | Achelpohl et al. | 242/559.1 |
| 4,638,957 A | * | 1/1987 | Graves | 242/559.1 |
| 4,659,030 A | * | 4/1987 | Graves et al. | 242/559.1 |
| 4,899,945 A | | 2/1990 | Jones | |
| 5,333,803 A | * | 8/1994 | Planeta | 242/559.1 |
| 5,697,756 A | * | 12/1997 | Wheaton | 242/559.1 |
| 6,267,320 B1 | * | 7/2001 | Gnan | 242/559.1 |

FOREIGN PATENT DOCUMENTS

| EP | 0 254 006 | * | 1/1988 |
| JP | 2-95652 | * | 2/1990 |

* cited by examiner

Primary Examiner—William A. Rivera
(74) Attorney, Agent, or Firm—Young & Basile, P.C.

(57) ABSTRACT

A dereeler for welding wire capable of dispensing wire from very heavy loaded reels wherein the reel may be rolled upon the reel spool peripheries into the dereeler and manually raised to a reel rotatable position. A carriage upon which the cradles supporting the reel are mounted is supported on a frame by a linkage system wherein pivoting of the carriage between reel loading and unloading positions permits the reel axle to be received within the cradles while the reel spools are supported on the floor, and pivoting of the carriage on the frame lifts the reel axle supported in the cradles from the supporting floor surface permitting rotation of the reel for wire dispensing purposes.

9 Claims, 6 Drawing Sheets

WELDING WIRE DEREELER

BACKGROUND OF THE INVENTION

1. Field of the Invention

A wire dereeler for dispensing wire coiled upon a reel having circular spool ends characterized by the ability to raise and lower a heavy loaded reel without hoists, ramps or inclines.

2. Description of the Related Art

Wire is usually handled by winding or coiling the wire upon a reel having circular spool ends. For instance, it is not uncommon to wind arc welding wire upon reels having a loaded weight of 1,000 pounds. Such reels must be handled by operators who position the loaded wire reel in dereeling apparatus which permits the wire to be dispensed by uncoiling the wire from the reel as the wire is consumed during welding. Usually, only a single operator is used to load and unload welding wire dereelers and because of the weight of a loaded reel, it is often necessary to use expensive hoists and the like to load the wire dispensers.

Some wire reel dispensers utilize inclined ramps and wedge surfaces upon which the reel, or its axle, is positioned such that rolling of the reel will cause the reel to move up the ramp or wedge to an elevated position from the supporting floor surface permitting the reel to rotate during wire dispensing once the weight of the reel is removed from the reel spool peripheries. The problem with this type of wire dispenser utilizing ramps or inclines is that considerable effort is required to roll a fully loaded reel up a slight incline even though the reel only need be elevated an inch or less to permit reel rotation during dispensing and safety of the operator is a concern. An example of a wire dereeler utilizing ramps is shown in U.S. Pat. No. 4,899,945.

OBJECTS OF THE INVENTION

It is an object of the invention to provide a wire dereeler wherein a heavy wire reel supported on reel end spools having circular peripheries may be easily raised by a single operator from a supporting floor surface to an elevated position to permit reel rotation to dispense the wire coiled thereon.

Another object of the invention is to provide a dereeler for wire wound on a reel having end spools having circular peripheries wherein a single operator may raise a fully wound spool from a supporting floor surface to an elevated reel rotating position without the use of power lifting equipment, ramps, inclines or hoists, and wherein the reel will be locked in its supporting structure during wire dispensing.

SUMMARY OF THE INVENTION

The invention is particularly suitable for dispensing arc welding wire, but can be used to dispense wire for other purposes. Wire reels may be of varying size and capacity, and larger welding wire reels weighing up to 1,000 pounds when fully wound can be handled by the invention. The reel consists of a central spindle having end spools of a flat configuration having circular peripheries whereby a heavy reel can be rolled across a floor surface upon the spool peripheries by a single operator. A central axial opening extends through the reel spindle and spools for receiving an axle during wire dispensing as later described.

The dereeler in accord with the invention includes a frame which may be formed of angle iron components, the sides of the frame being substantially identical whereby the frame sides are separated by a distance which permits a wire reel to be rolled between the frame sides, and the frame sides are interconnected at the rear end of the frame to maintain the spacing of the frame sides and permit control boxes and the like to be attached to the frame. There is no interconnecting structure between the frame sides at the front end of the frame which accepts the wire reel such that the wire reel may be rolled into the frame between its sides without interference.

A carriage is pivotally mounted upon the frame and is of a generally U-shaped configuration having a pair of arms interconnected by a base. The arms include outer ends which are pivotally connected to the frame sides, and the arms are spaced from each other by a distance permitting the wire reel to be received therebetween. Accordingly, the wire reel, when rolled between the frame sides, is also positioned between the carriage arms. The carriage includes an operating handle affixed to the carriage base located above the arm outer ends, and substantially spaced from the pivot supporting the carriage on the frame.

A cradle is mounted upon each carriage outer end including a semi-circular bearing supporting surface, and prior to the reel being rolled into the frame between the carriage arms, an axle is inserted in the reel axial opening having ends which extend beyond the reel spools. One of the axle ends includes a drive gear affixed thereto, and each axle end includes an anti-friction bearing, such as a ball bearing, whose outer race is received within an arm cradle when the reel is rolled into the frame.

A reel driving shaft is rotatably mounted upon the outer end of one of the carriage arms adjacent the associated cradle, and this drive shaft includes a gear which meshes with the reel axle gear when the reel axle is properly positioned within the associated cradle establishing a driving relationship between the carriage arm shaft and the reel. The carriage arm shaft also includes a belt sheave or pulley which is connected by a flexible belt to a transmission mounted upon the base of the carriage powered by a reversible variable speed electric motor. In this manner, the electric motor is in a torque transmitting relationship to the reel for producing reel rotation.

Initially, the wire reel will be supported by the floor surface upon which the frame is supported. Once the reel axle bearings are properly located within the carriage arm cradles, the operator grasps the carriage handle and pushes the handle rearwardly toward the frame base. This force applied to the carriage handle pivots the carriage about supporting pivots toward the frame base and, due to the position of the carriage pivots to the cradles, the cradles will raise the reel sufficiently to lift the reel spool peripheries from the supporting floor surface to permit the entire support of the reel to be through the reel axle bearings and carriage cradles. The carriage handle is pushed rearwardly until stops defined on the carriage engage stop surfaces formed on the frame. At this position, the axle of the reel, which defines the center of gravity of the heavy wire reel, will have passed through the vertical projection of the pivots supporting the carriage, and due to the weight of the reel, this over-center relationship of the weight of the reel with respect to the carriage pivots will maintain the reel in its elevated position permitting the reel to be rotated by the motor, transmission, belt, arm mounted shaft, shaft gear, and the axle gear.

An axle lock is associated with the carriage cradle upon which the reel drive shaft is supported. This axle lock consists of a lever or latch which is pivotally mounted on the cradle and superimposed over the reel axle bearing adjacent the reel gear during dereeling and this axle lock firmly maintains the reel axle bearing within its cradle insuring proper meshing of the axle gear and drive gear during reel rotation and preventing inadvertent disengagement of the axle from its cradles. The axle lock may be manually operated, but in the preferred embodiment, an axle lock operating link is interposed between the axle lock and the frame so that the axle lock will automatically be positioned in its operative condition when the carriage has been rotated to raise the reel from the floor surface in order to permit reel rotation and the link automatically opens the cradle to receive or release the reel axle bearing.

When it is desired to change wire reels, the operator grasps the carriage handle and pulls it forward away from the frame base. This action, initially, requires the reel to be slightly raised until the center of gravity of the reel passes through the vertical projection of the carriage pivots and continued forward movement of the carriage and reel due to the carriage pivotal action will lower the reel until the reel spool outer peripheries engage the floor. This forward movement of the reel will cause the axle lock to pivot to an open position through the actuation of the axle lock by its operating link, and once the spool peripheries engage the floor, the reel can be easily rolled forward disengaging the reel axle bearings from the carriage cradles and the reel removed from between the carriage arms and frame sides. A new fully wound wire reel can then be rolled into the dereeler frame, and the process previously described is repeated. It is to be appreciated that it is only necessary to raise the wire reel less than an inch to remove the reel's weight from its spools, and the mechanical advantage achieved by the short lever arm between the carriage pivots and the center of the reel axle as compared to the much greater lever arm between the carriage handle and its pivots permits a fully wound reel to be lifted by one operator the necessary height between the loading and unloading positions of the carriage wherein the reel is supported upon the floor, and the wire dispensing or rotating position of the reel wherein the reel is lifted from the floor and its rotation driven under the influence of the electric motor and associated drive components.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

With reference to the drawings, the floor surface upon which the dereeler of the invention is supported is illustrated at 10. The floor 10 will normally be the regular floor surface of the room or area in which wire dereeling occurs, and as the wire reels are normally rolled about on the floor 10, the dereeler apparatus described below is mounted upon the same floor surface.

A wire dereeler in accord with the invention includes a frame 12 which may be fabricated of angle iron or similar steel components. The frame 12 includes a pair of floor pieces 14 spaced apart a distance several inches greater than the width of a reel from which wire is to be dispensed. Each floor piece 14 supports a frame side 16 whose general configuration will be appreciated from the drawings. The frame sides 16 are interconnected at the rear of the frame by a box frame structure including base columns 18. Accordingly, it will be appreciated that the frame 12 is formed of a pair of similar sides 16 spaced apart by the base structure 18 a distance greater than the width of the wire reels.

Figure 1:
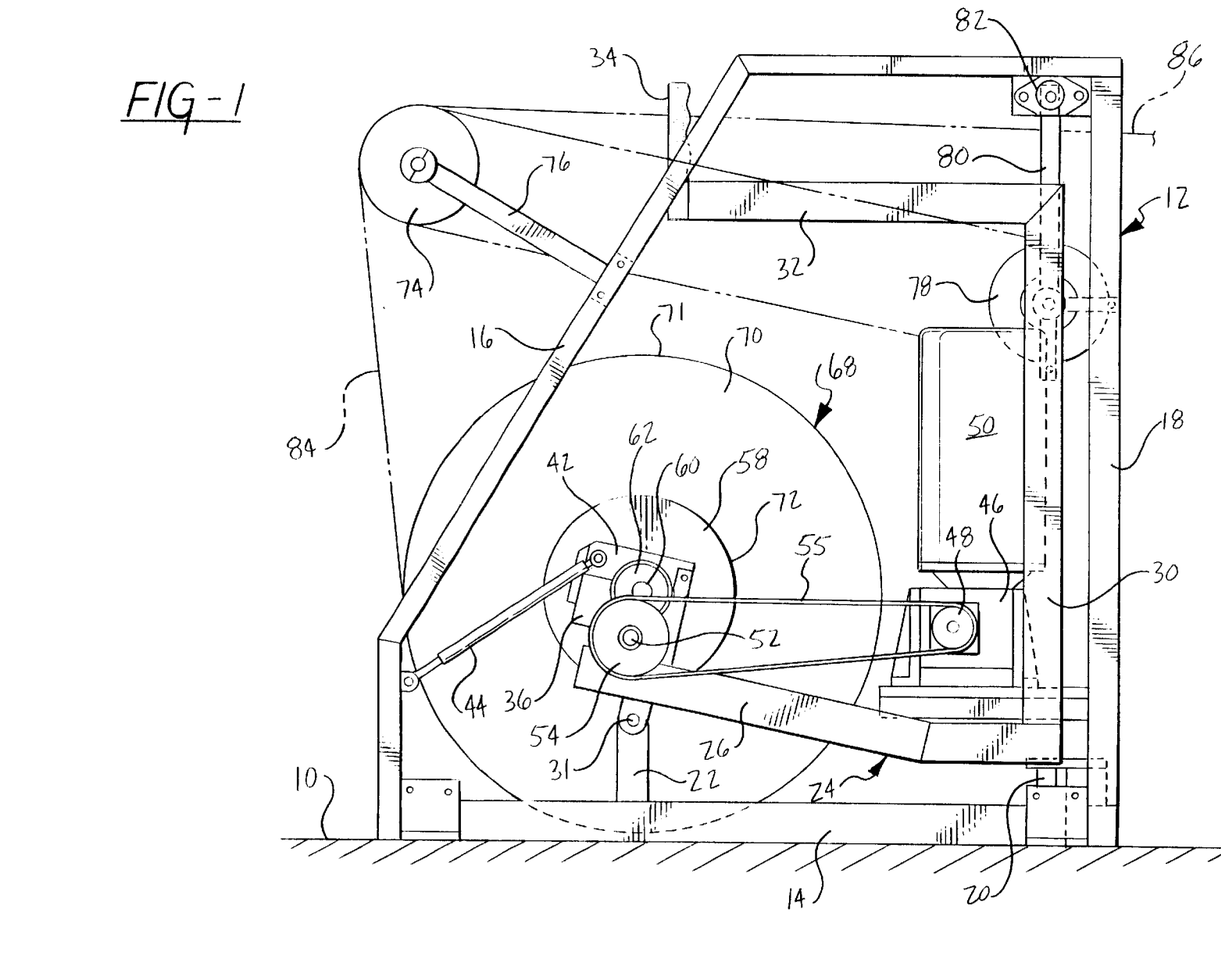
FIG. 1 is a side elevational view of a wire dereeler in accord with the invention with the components shown in the operative reel rotating wire dereeling or dispensing position.
Figure 2:
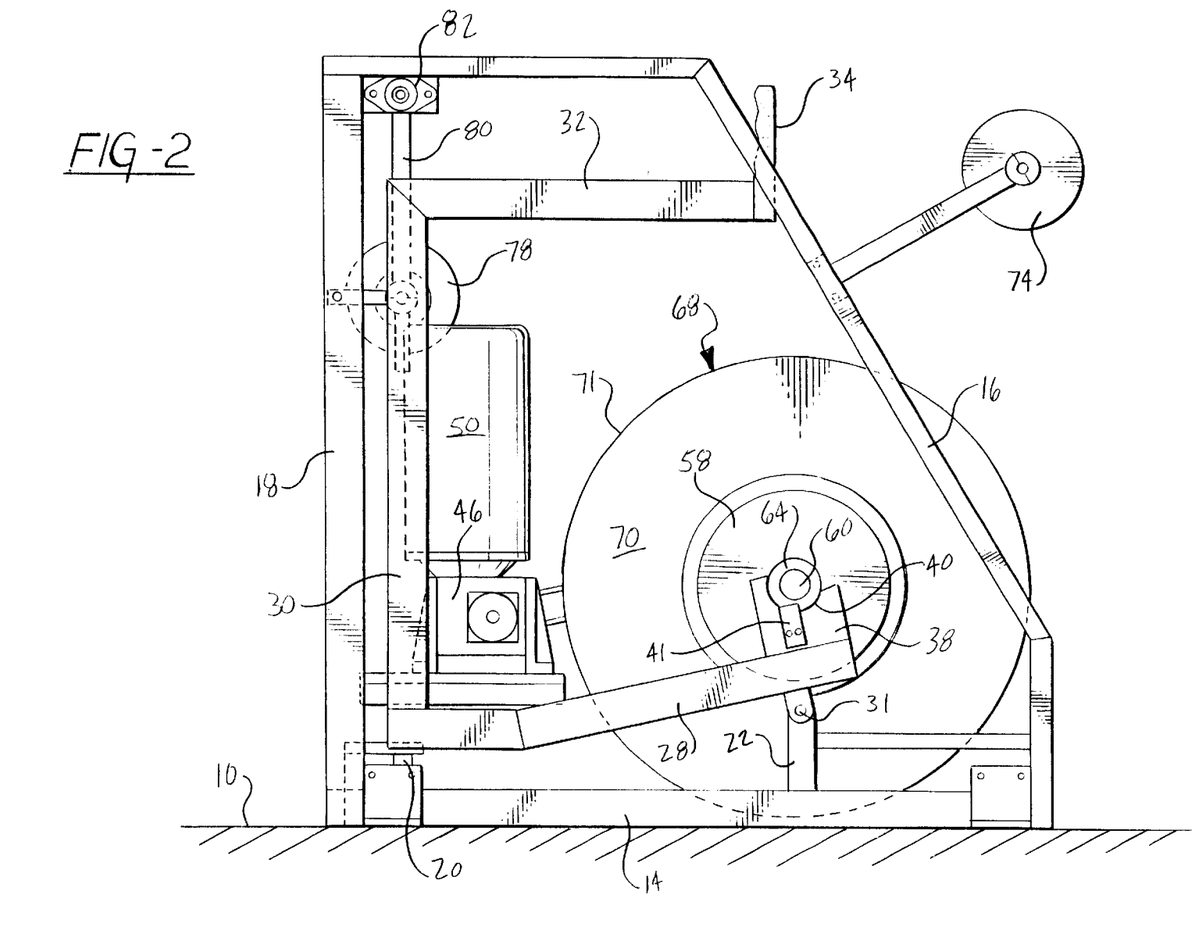
FIG. 2 illustrates the opposite side of the dereeler shown in FIG. 1, the wire being removed from the reel not being shown for purpose of clarity.

A carriage stop 20, FIGS. 1 and 2, is mounted upon each of the floor pieces 14, and a carriage pivot post 22 is mounted upon each floor piece 14 extending vertically for pivotally supporting the carriage, as later described.

The frame 12 pivotally supports a carriage 24 between frame sides 16 which consists of spaced parallel arms 26 and 28 which are spaced apart a distance slightly greater than the length of the reel to be dereeled. The outer ends of the arms 26 and 28 are free, and the inner ends of the arms are connected to base columns 30 which extend upwardly, and maintain the spacing between the arms 26 and 28. The entire carriage 24 is pivotally mounted upon the frame 12 by the carriage pivots 31 interconnecting the carriage pivot posts 22 with the outer end of the carriage arm located directly above.

The carriage base columns 30 support a handlebar 32 which extends forwardly and terminates in an upwardly extending handle 34. The purpose of the handle 34 is to pivot the carriage 24 on the carriage pivots 31, as later described.

The outer end of the carriage arm 26 supports a cradle 36, while the outer end of the arm 28 supports a cradle 38. Each of the cradles 36 and 38 includes a partial cylindrical surface 40, extending upwardly, for receiving a reel axle bearing as later described. The cradle 38 includes a bearing positioner 41 as apparent in FIG. 9.

Figure 6:
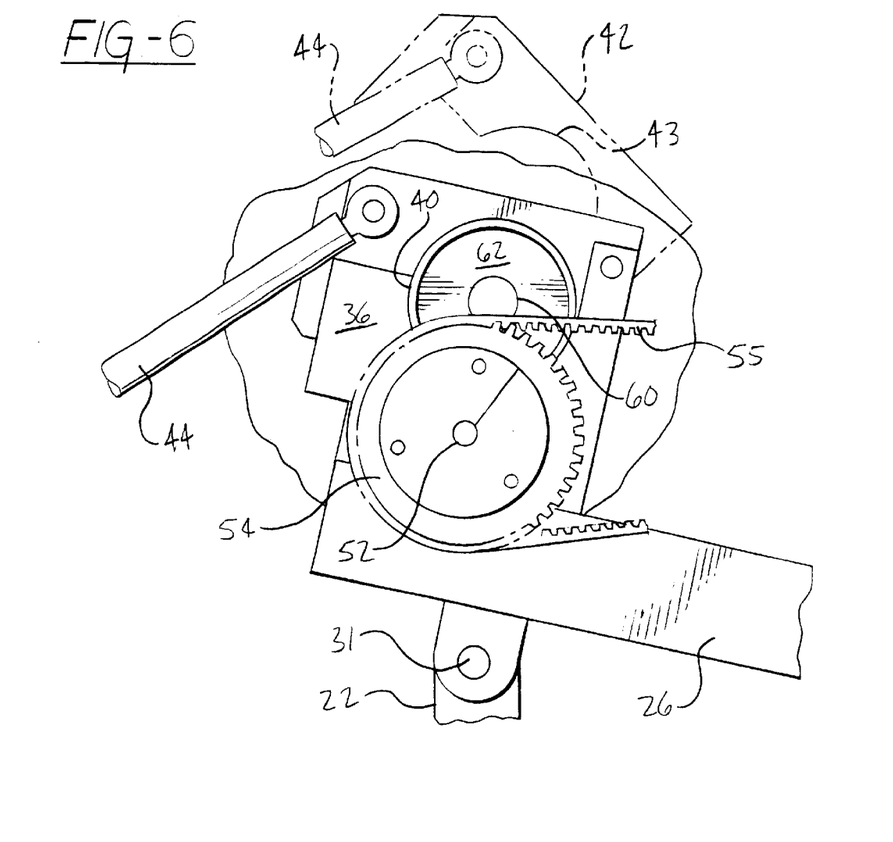
FIG. 6 is a detail elevational view of the carriage arm drive outer end and cradle shown in FIG. 5 showing the axle lock in its open position in dotted lines and in its lock position in full lines.

An axle latch lock 42 is pivotally mounted upon the cradle 36 mounted on carriage arm 26, and the latch lock 42 includes a partially cylindrical surface 43, FIG. 3, for cooperating with the associated reel axle bearing as described below. The latch lock 42 is operated by a latch lock link 44, FIG. 3, which is pivotally supported to the adjacent frame side 16 and the non-pivoted end of the lock 42 so as to be pivotable between the axle open or release and locking positions as shown in FIG. 6.

A transmission 46 is mounted upon the carriage 24 adjacent the base columns 30, and the transmission 46 includes an output pulley 48 having a herringbone toothed periphery. The transmission 46, and pulley 48, are driven by the reversible variable speed electric motor 50 drivingly connected to the transmission.

Figure 5:
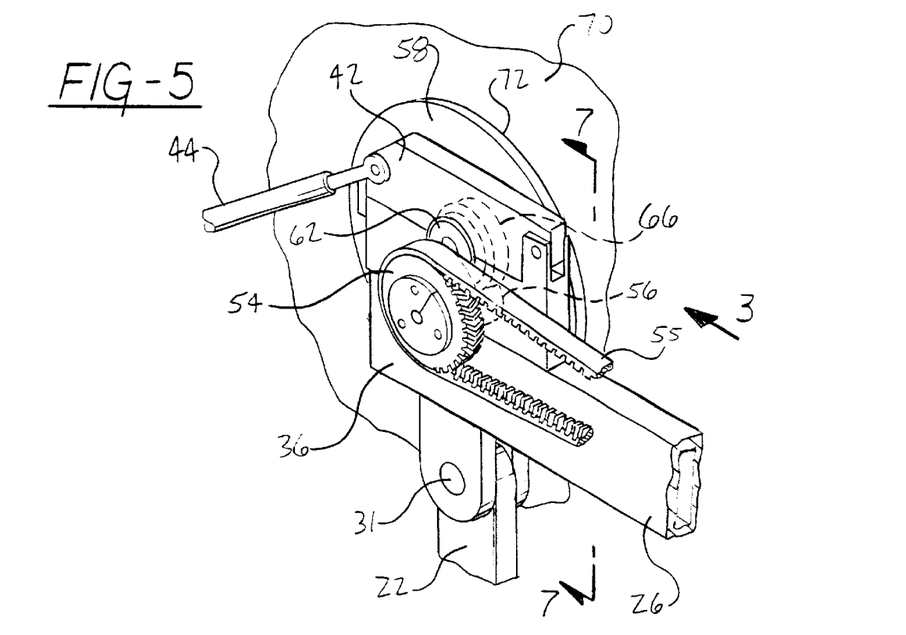
FIG. 5 is a detail perspective view of the carriage arm drive outer end illustrating the reel drive structure and the axle lock being in the closed position.
Figures 7, 8, 9:
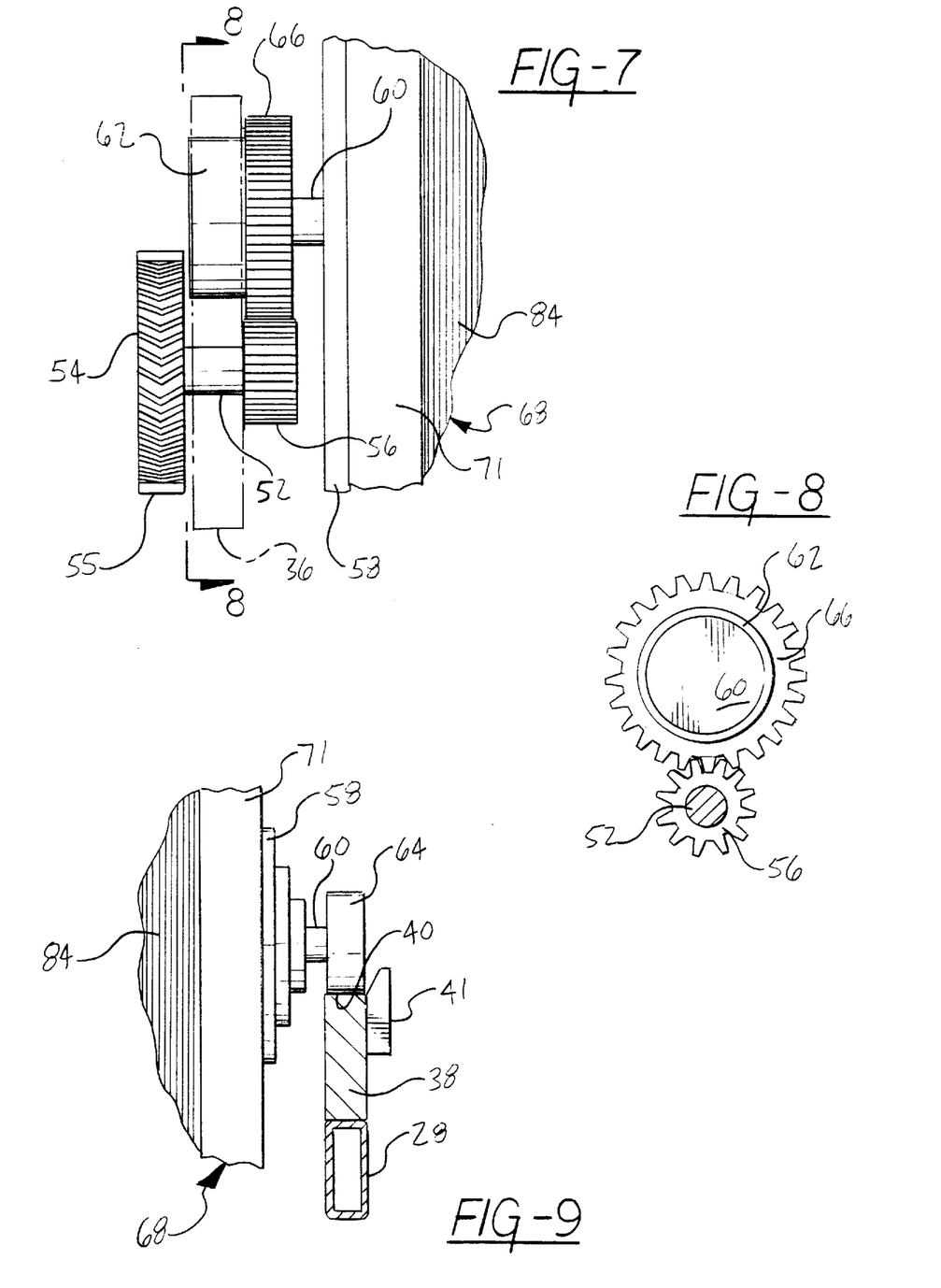
FIG. 7 is an elevational view as taken along Section 7—7 of FIG. 5, the arm and cradle being shown in phantom lines.
FIG. 8 is a sectional view of the reel gear and drive shaft gear as taken along Section 8—8 of FIG. 7.
FIG. 9 is a detail elevational view of the reel axle and carriage arm as taken along Section 9—9 of FIG. 2.

A drive shaft 52 is rotatably mounted upon the outer end of the carriage arm 26, FIGS. 5 and 7, and the outer end of the drive shaft 52 supports a herringbone toothed pulley 54 which cooperates with the toothed flexible belt 55 interposed between the pulleys 48 and 54. In this manner, the transmission 46 and motor 50 will rotate the pulley 54.

A spur gear 56 is mounted upon the inner end of the drive shaft 52, FIG. 7, and as later described, the gear 56 meshes with a gear mounted upon the reel axis when the wire reel is in its dereeling position.

The reel axle structure includes hubs 58 which are received within the reel spool openings, and the reel axle 60 extending through the reel hubs 58 extends beyond the reel hubs in both directions. Each end of the reel axle 60 is provided with an antifriction bearing. The portion of the reel axle adjacent the carriage arm 26 includes bearing 62, while the portion of the reel axle adjacent carriage arm 28 supports bearing 64. Both of the bearings 62 and 64 include an outer cylindrical race whose diameter corresponds to the cylindrical surfaces 40 defined in the cradles 36 and 38, and the latch lock surface 43. As appreciated in FIG. 7, a spur gear 66 is mounted on the reel axle 60 adjacent and inwardly of the ball bearing 62, and the spur teeth of the gear 66 correspond with the spur teeth of gear 56 whereby these gears will mesh when a reel is fully mounted upon the carriage 24.

In the drawings, a typical reel from which wire, such as welding wire, is dereeled is shown at 68. Such reels include end spools 70 having circular peripheries 71 and axial openings 72 which receive the reel hubs 58 in a non-rotational manner so that rotation of the reel hubs 58 will also rotate the reel 68.

A fixed double groove pulley 74 is rotatably mounted upon the frame 12 by support 76, and the pulley 74 is located above the reel and approximately midway between the spools 70. A movable wire guide pulley 78 is mounted upon the frame 12 by a swing arm 80 which usually includes a potentiometer 82 which is connected to the control for the motor 50 so that as the tension in the dereeled wire changes, the rotation of the reel by the motor can be correspondingly regulated. The pulleys 74 and 78 comprise a known "take up" system used with wire and thread. In FIG. 1, the wire initially removed from the reel is indicated at 84, and the wire path over the pulleys 74 and 78 is indicated in phantom lines and the wire exits the dereeler at 86. The wire will be fed at 86 into the wire distribution system, not shown, which may include feeders or straighteners and the wire ultimately arrives at the arc welding location.

Figure 3:
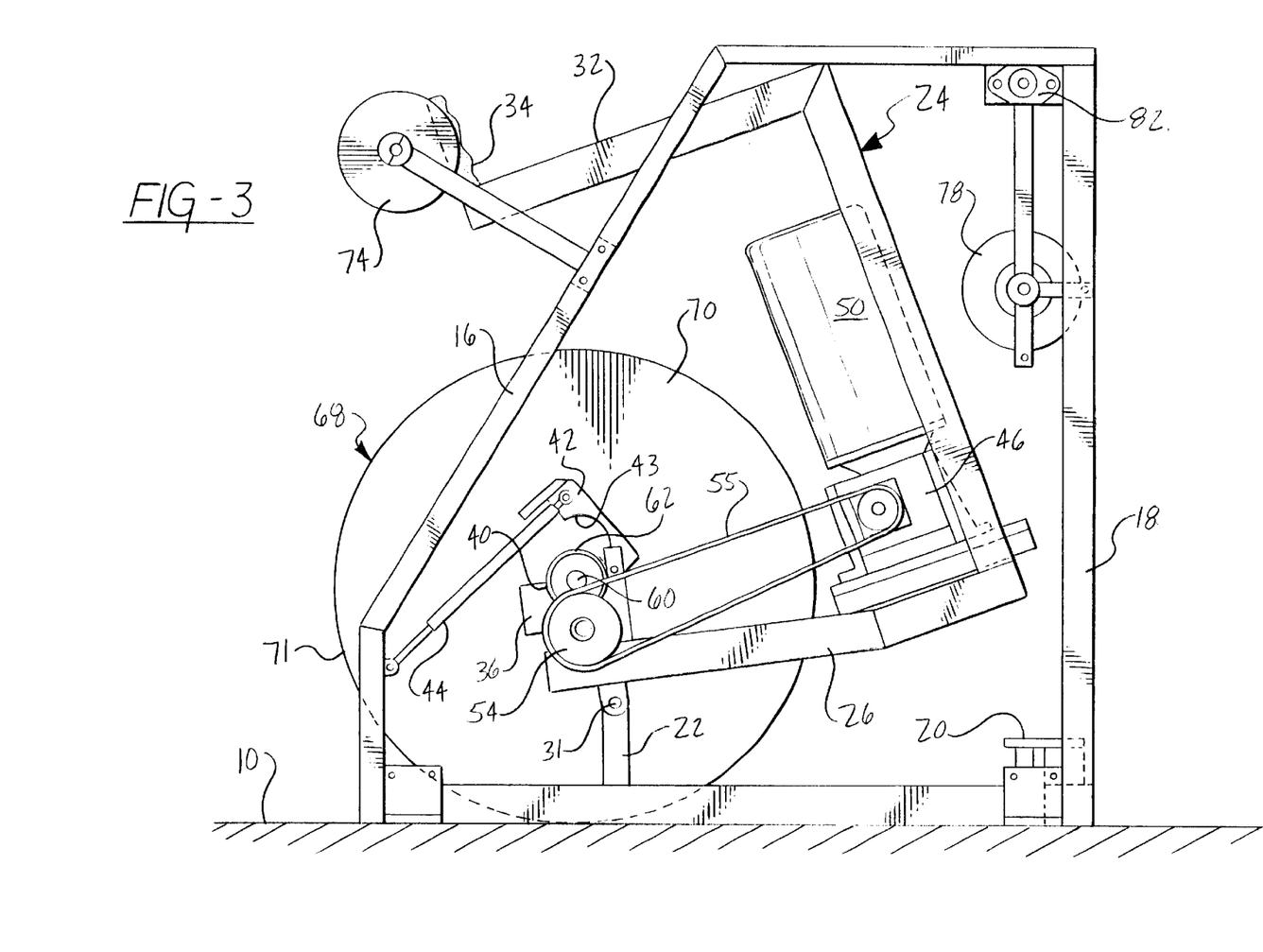
FIG. 3 is a view similar to FIG. 1 illustrating the carriage in the reel loading or unloading position wherein the reel weight is supported upon its spools.
Figure 4:
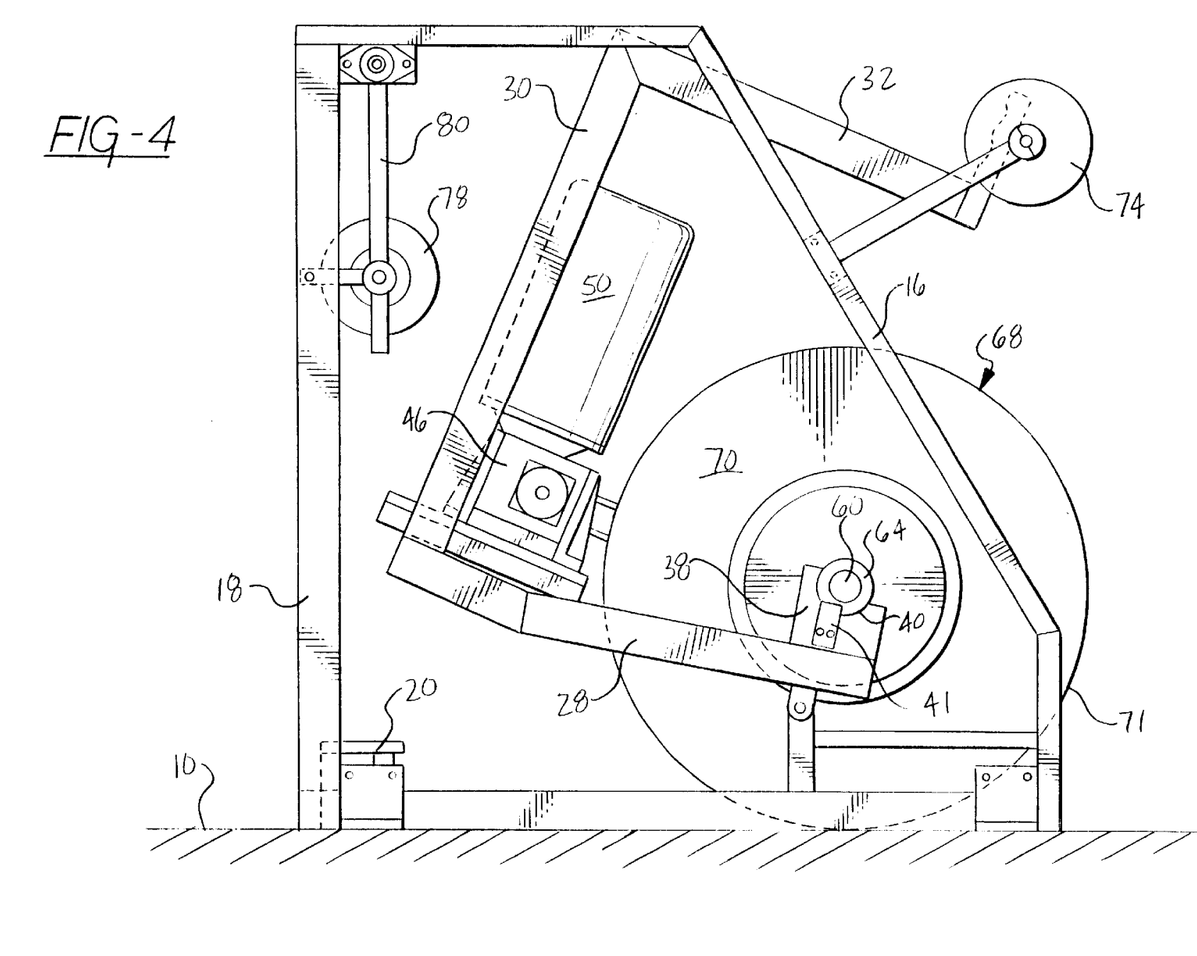
FIG. 4 is a view of the opposite side of the dereeler when in the loading or unloading position of FIG. 3.

To load the wire dereeler of the invention, the carriage 24 is pivoted forwardly to its loading or unloading position about the pivots 31 as shown in FIGS. 3 and 4. Such pivoting of the carriage 24 is produced by the operator grasping the handle 34 and pulling the same forward to tilt the carriage 24 as shown in FIGS. 3 and 4. In this loading or unloading position, the cradles 36 and 38 have moved forwardly and downwardly due to the relationship of the cradles to the carriage pivots 31. Pivoting of the carriage 24 forwardly causes the latch lock link 44 to pivot the latch lock 42 to the open position shown in FIG. 3, and in phantom lines in FIG. 6 and with the carriage 24 in this loading position as shown in FIGS. 3 and 4, a reel 68 rolling upon its spool peripheries 71 may be rolled into the frame 12 intermediate the frame sides 16 and the carriage arms 26 and 28.

Prior to positioning the reel 68 into the frame 12, the reel hubs 58 are located within the reel spool's axial openings 72 and fixed therein, and it will be understood that the reel axle structure is located within the wire reel 68 prior to being loaded into the frame 12.

As the reel 68 is rolled across the floor 10 into the frame 12, the semi-circular surfaces 40 of the cradles 36 and 38 will receive the reel axle ball bearing outer races 62 and 64, respectively, due to the cradle shapes. Accordingly, it will be appreciated that the dimensions of the cradles 36 and 38 are so related to the carriage pivots 31 and the resultant position of surfaces 40 that the reel may be easily rolled into the frame 12 intermediate the cradles 36 and 38 as shown in FIG. 3 without resistance other than the rolling resistance of the reel.

Once the reel 68 is positioned as shown in FIGS. 3 and 4, the operator grasps the carriage handle 34 and pivots the carriage rearwardly to the position shown in FIGS. 1 and 2. Because of the mechanical advantage achieved by the location of the carriage pivots 31 and the handle 34, it is possible for the operator to lift a 1,000 pound wire reel a vertical distance which will lift the reel spool peripheries from the floor 10 as shown in FIGS. 1 and 2. Such rearward pivoting of the carriage 24 to raise the reel 68 to its rotatable or dereeling position causes the latch lock link 44 to pivot the latch lock 42 to its locked position as shown in FIGS. 1, 5 and 6. In this locked position, the latch lock 42 engages the upper portion of the reel axle bearing 62 preventing the bearing 62 from disengaging from the cradle 36. The reel axle bearing 64 will be maintained within the cradle 38 by the weight of the reel and wire.

As the reel 68 is rolled into the cradle 36, the gear 66 mounted upon the reel axle 60 will mesh with the teeth of the gear 56 mounted upon the drive shaft 52. Accordingly, a driving relationship is automatically established between the motor 50, transmission 46 and the reel 68 once the reel is properly positioned within the cradles 36 and 38.

When pivoting the carriage 24 rearwardly from the reel loading or unloading position to the reel dereeling position, rearward pivoting movement of the carriage 24 is terminated upon the carriage engaging the stops 20 formed on the frame 12 as shown in FIGS. 1 and 2. When pivoting the carriage 24 from the loading or unloading position of FIGS. 3 and 4 to the reel rotative position of FIGS. 1 and 2, the center of gravity of the reel 68, as defined by the axis of the axle 60, passes through the vertical projection of the carriage pivots 31. This produces an "over-center" relationship between the reel axle axis and the carriage pivots 31 which locks the carriage in its reel rotative position. The motor 50 and transmission 46 are now capable of rotating the reel 68 and enough wire is dereeled to string the wire over the pulleys 74 and 78 into the wire exiting and distribution system. The wire on the reel 68 may now be removed therefrom as used and consumed, and the reel 68 will be rotated by the motor 50 and transmission 46 through belt 55 and meshing gears 56 and 66 as controlled by the wire requirements.

Upon the wire being removed from the reel 68, a new full reel is required. Accordingly, the operator grasps the carriage handle 34 and tilts the carriage forward to the position shown in FIGS. 3 and 4. This tilting of the carriage reverses the previously described movements and the latch lock 42 will automatically open as shown in FIG. 3 under the influence of the lock link 44. The empty reel, now lowered to the floor 10, can be easily rolled across the floor 10 from the frame 12, and a new loaded reel will be rolled into the frame 12, lifted, and the previous operative cycle repeated.

Because a wire dereeler constructed in accord with the invention does not require any vertically inclined ramps or guides, or hoists, a fully loaded reel can be readily safely loaded into the dereeler by a single operator. A dereeler constructed and operated in accord with the inventive concepts is safer than dereelers utilizing inclined guides and ramps, and use of the invention permits a plurality of dereelers to be located in close proximity and serviced by a minimum of operators.

It is appreciated that various modifications to the inventive concepts may be apparent to those skilled in the art without departing from the spirit and scope of the invention.

What is claimed is:

1. A wire dereeler for dispensing wire wound on a reel and having a pair of end spools having a circular periphery and an axial opening, the wire dereeler comprising a frame adapted to rest on a support surface, a carriage pivotally mounted upon said frame by a carriage pivot and pivotally movable between a reel loading and unloading position and a reel rotatable position, locking means for holding said carriage in said reel rotatable position, an axle mountable within the reel axial opening and dimensioned to extend axially beyond the reel spools, said carriage including a pair of spaced arms, each arm having an outer end, an axle cradle defined on each arm outer end, the reel being receivable between said arms while being rolled on its spools' peripheries upon the support surface to locate said reel axle within said cradles when said carriage is in said reel loading and unloading position, pivoting of said carriage to said reel rotatable position lifting the spools' peripheries from the support surface, reel drive means mounted on said carriage drivingly connected to the reel when said carriage is in said reel rotatable position to rotate the reel in a wire dereeling direction, and wire guide means defined on said frame for guiding wire removed from the reel.

2. In a wire dereeler as in claim 1, said locking means holding said carriage in said reel rotatable position including a stop defined on said frame engageable by said carriage locating said carriage at said reel rotatable position wherein the center of gravity of the reel is moved past the vertical projection of said carriage pivot.

3. In a wire dereeler as in claim 1, said reel drive means including an electric motor mounted on said carriage, a transmission mounted on said carriage driven by said motor, an axle gear mounted on said reel axle concentric thereto, a drive gear rotatably mounted on said carriage meshing with said axle gear upon said axle being located within said cradles, and a torque transmitting member interconnecting said transmission and said drive gear for rotating said drive gear, axle gear and the reel.

4. In a wire dereeler as in claim 3, said torque transmitting member comprising a flexible belt.

5. In a wire dereeler as in claim 1, an axle lock pivotally mounted on at least one of said cradles pivotal between a lock position overlying said axle when said axle is located within the associated cradle to prevent the axle from disengaging from said associated cradle, and an unlocked open position permitting the axle to enter or be removed from said associated cradle.

6. In a wire dereeler as in claim 5, an axle lock operating link interconnecting said axle lock and said frame whereby pivoting of said carriage from said reel loading and unloading position to said reel rotatable position automatically pivots said axle lock to said lock position, and pivoting of said carriage from said reel rotatable position to said reel loading and unloading position automatically pivots said axle lock to said unlock open position.

7. A wire dereeler for dispensing wire wound on a reel and having a pair of end spools having a circular periphery and an axial opening, the wire dereeler comprising:

a frame adapted to rest on a support surface;
an axle mountable within the reel axial opening and dimensioned to extend axially beyond the reel spools;
a carriage including a pair of spaced arms, each arm having an outer end and an axle cradle defined on each arm outer end, the carriage being pivotally mounted upon the frame and pivotally movable between a reel loading and unloading position and a reel rotatable position;
a reel drive mounted on the carriage and drivingly connected to the reel when the carriage is in the reel rotatable position to rotate the reel in a wire dereeling direction;
wire guide means provided on the frame for guiding wire removed from the reel; and
locking means for holding the carriage in the reel rotatable position, the locking means including a stop defined on the frame engageable by the carriage locating the carriage at the reel rotatable position wherein the center of gravity of the reel is moved past the vertical projection of the carriage pivot.

8. A wire dereeler for dispensing wire wound on a reel and having a pair of end spools having a circular periphery and an axial opening, the wire dereeler comprising:

a frame adapted to rest on a support surface;
an axle mountable within the reel axial opening and dimensioned to extend axially beyond the reel spools;
a carriage including a pair of spaced arms, each arm having an outer end and an axle cradle defined on each arm outer end, the carriage being pivotally mounted upon the frame and pivotally movable between a reel loading and unloading position and a reel rotatable position;
locking means for holding the carriage in the reel rotatable position;
wire guide means provided on the frame for guiding wire removed from the reel; and
a reel drive provided on the carriage and drivingly connected to the reel when the carriage is in the reel rotatable position to rotate the reel in a wire dereeling direction, the reel drive including an electric motor mounted on the carriage, a transmission mounted on the carriage driven by the motor, an axle gear mounted on the reel axle concentric thereto, a drive gear rotatably mounted on the carriage meshing with the axle gear upon the axle being located within the cradles, and a torque transmitting member interconnecting the transmission and the drive gear for rotating the drive gear, the axle gear, and the reel.

9. A wire dereeler for dispensing wire wound on a reel and having a pair of end spools having a circular periphery and an axial opening, the wire dereeler comprising:

a frame adapted to rest on a support surface;
an axle mountable within the reel axial opening and dimensioned to extend axially beyond the reel spools;
a carriage including a pair of spaced arms, each arm having an outer end and an axle cradle defined on each arm outer end, the carriage being pivotally mounted upon the frame and pivotally movable between a reel loading and unloading position and a reel rotatable position;
a reel drive mounted on the carriage and drivingly connected to the reel when the carriage is in the reel rotatable position to rotate the reel in a wire dereeling direction;
locking means for holding the carriage in the reel rotatable position;

wire guide means provided on the frame for guiding wire removed from the reel; and an axle lock pivotally mounted on at least one of the cradles and pivotal between a locked position overlying the axle when the axle is located within the associated cradle to prevent the axle from disengaging from the associated cradle, and an unlocked open position permitting the axle to enter or be removed from the associated cradle.

\* \* \* \* \*